(No Model.) 2 Sheets—Sheet 1.

C. SUTPHEN.
TRANSIT INSTRUMENT.

No. 444,602. Patented Jan. 13, 1891.

WITNESSES: INVENTOR

Andrew M. Todd
James C. Ward

Clinton Sutphen

THE NORRIS PETERS CO., PHOTO-LITHO., WASHINGTON, D. C.

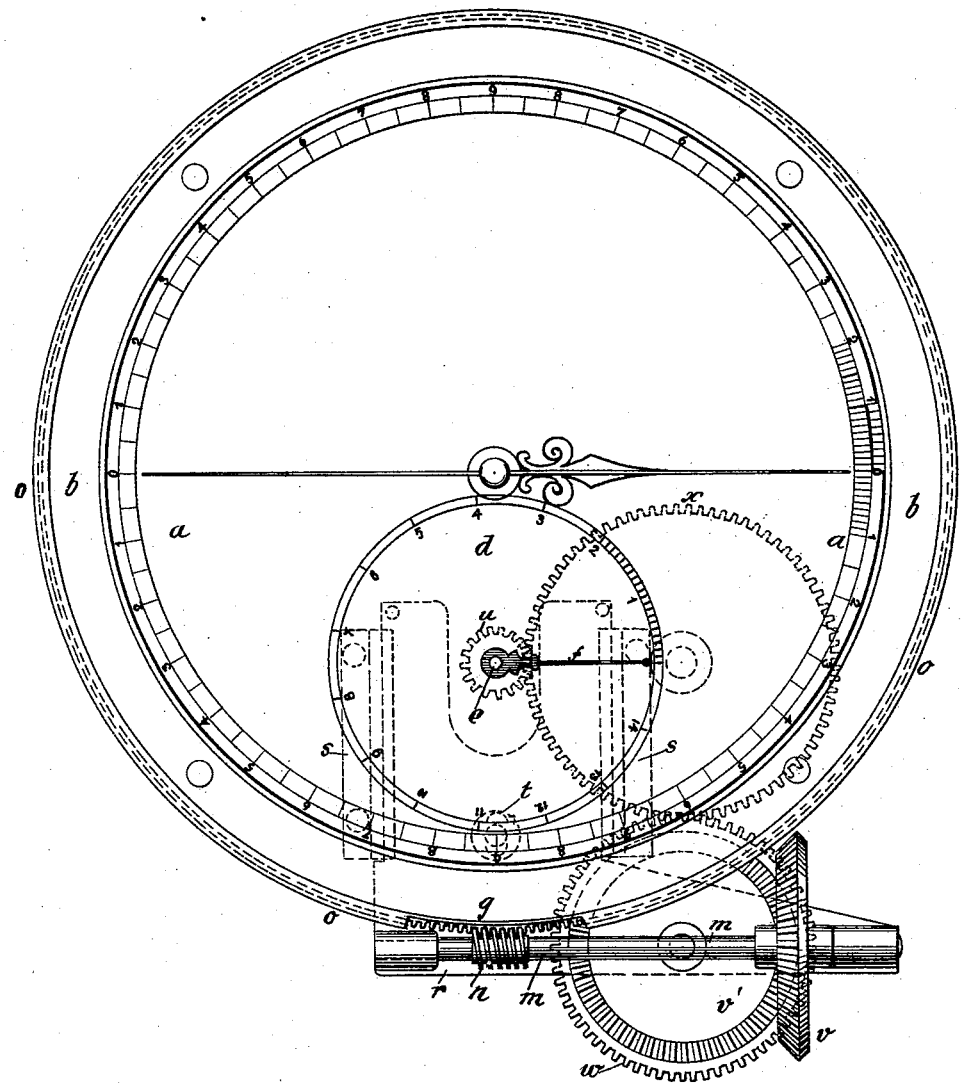

UNITED STATES PATENT OFFICE.

CLINTON SUTPHEN, OF NEW YORK, N. Y., ASSIGNOR OF ONE-HALF TO EUGENE H. HINTON, OF SAME PLACE.

TRANSIT-INSTRUMENT.

SPECIFICATION forming part of Letters Patent No. 444,602, dated January 13, 1891.

Application filed May 27, 1890. Serial No. 353,364. (No model.)

*To all whom it may concern:*

Be it known that I, CLINTON SUTPHEN, of the city, county, and State of New York, have invented certain new and useful Improvements in Transit-Instruments, of which the following is a specification.

In transit-instruments heretofore constructed for surveyors it has been found impossible to determine very closely the value of the angles. With a vernier-plate the parts of a degree may be approximately determined. By reason of my improvements the precise value of the angle can be read in minutes and seconds, or even fractional parts of seconds. This measurement of the angle is obtained by reading it on a dial-plate, by reason of which not only the actual value is determined, but there is no liability of mistaking the reading of the angle, as is sometimes the case with the use of a vernier-plate.

My invention consists in the combination, with the compass circular plate of the transit-instrument, containing a dial having minute subdivisions of a degree arranged within said compass circular plate, of a telescope-plate, the two plates being connected together by gearing, so as to be operated in conjunction with each other.

It further consists in certain specific combinations and arrangements of the mechanical parts hereinafter described.

Figure 1:
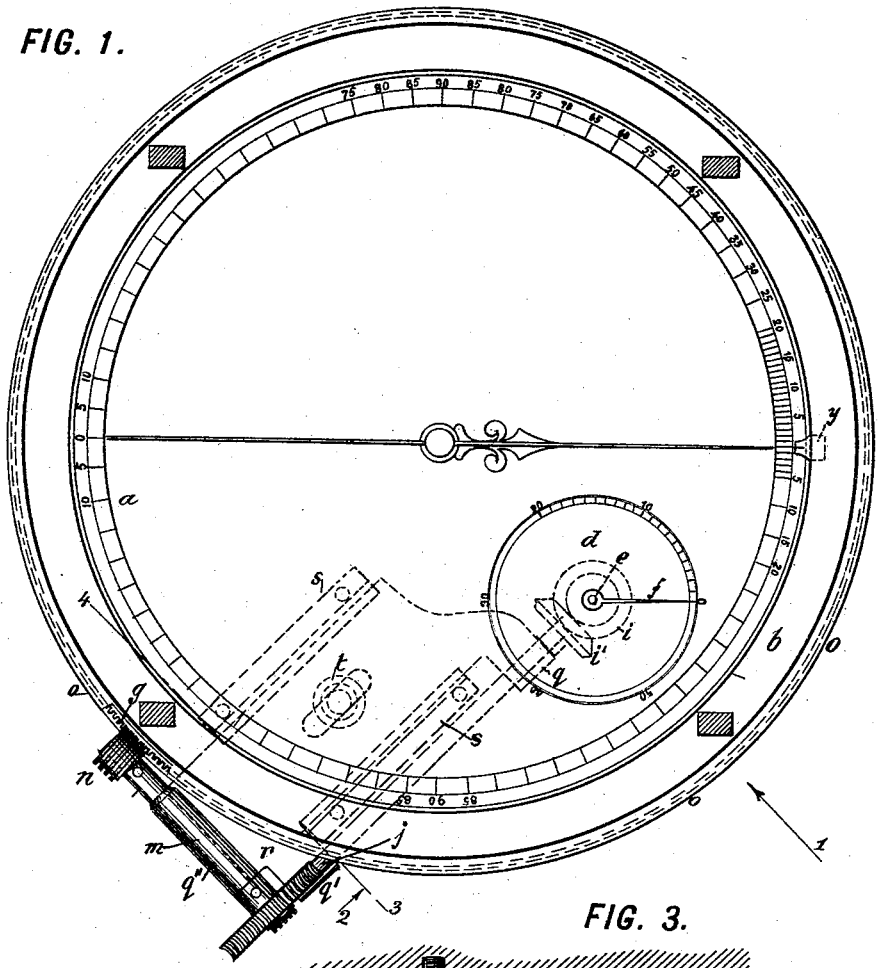
Figure 3:
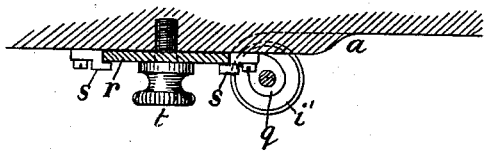
Figure 2:
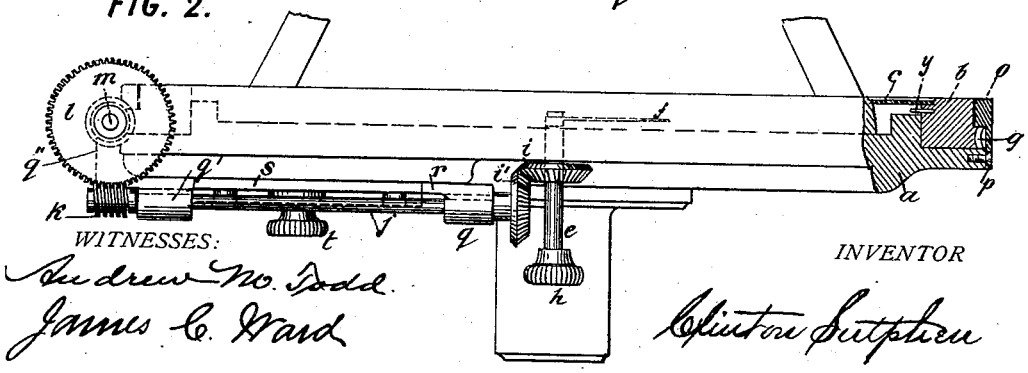

In the drawings, Figure 1 is a plan view of a transit-instrument to which my invention is applied. Fig. 2 is a side view of the same, partly in section, looking in the direction of the arrow 1 on Fig. 1. Fig. 3 is a vertical section taken in the line 3 4, looking in the direction of the arrow 2. Fig. 4 is a plan view of a transit-instrument to which is applied a modification of my invention.

$a$ is a lower plate carrying the compass-circle.

$b$ is the upper plate, to which is attached the telescope.

The details of construction of the transit-instrument in other respects are as found in many instruments in use by surveyors, with the exception of some modifications of its parts necessary to be made in order to apply my improvements to it. These differences in construction it will therefore only be necessary to describe in order to enable those skilled in the art to apply my improvements.

$c$ is the glass covering the compass, and its edge is let into the transit-instrument shown in the drawings at the inner edge of the upper circle or plate $b$.

Within the compass-box, at $d$, is a dial-plate for registering the minutes, seconds, and parts of seconds.

$e$ is a spindle extending down through the center of this dial-plate, and $f$ is an index-hand attached at the upper end thereof.

Upon the outer periphery of the upper circular plate $b$ is placed a continuous circular rack composed of cogs $g$. Intermediate between the outer portion of this cog-rack and the spindle $e$ of the dial-plate is placed a system of gearing, so that by turning the thumb-screw $h$ at the lower end of the spindle $e$ the index hand or pointer $f$ is thereby moved in order to show the value of a portion of a degree. At the same time the upper circular plate will be rotated until the line of vision through the telescope is brought into coincidence with such marking or value shown on the dial-plate.

The intermediate gearing may be constructed in any known way, but as shown in Fig. 1 it is as follows: $i\ i'$ are two beveled cog-wheels, $i$ being placed upon the vertical spindle $e$, and $i'$ upon the horizontal shaft $j$. At the other end of this shaft $j$ is a worm $k$, which gears with the cogs of a wheel $l$, placed in a vertical position immediately above the worm $k$. This transfers motion to the horizontal shaft $m$, to the other end of which shaft is affixed a worm $n$, which latter worm gears with the circular rack of cogs $g$. The cog-rack $g$ is protected by the rim $o$, which is attached to the lower plate $a$ by screws, one of which is shown at $p$. The upper portion of this rim $o$ is flush with the top surface of the upper plate $b$. A portion of this rim—namely, at the place where the worm $n$ meshes with the cog-gear—is cut away. This permits of contact of the worm $n$ with the cog-rack $g$, while at all other points the cog-rack is concealed. This system of gearing is supported by the bearings $q\ q'\ q''$, and can be thrown out of contact with the transit-instrument in case it is so desired. The bearings are connected to the plate *r*. Ways *s s* are attached to the lower or compass plate, so that the plate *r* can be pulled out, thereby disconnecting the worm *n* from the cog-rack *g*, and the beveled wheel *i'* from the beveled wheel *i' t* is a set-screw, by means of which the plate *r* and its attached gearing can be firmly screwed into place when the worm *n* is thrown into contact with the cog-rack *g*. One revolution of the shaft *m* will cause the wheel *l* to turn one degree, as indicated on the compass-circle. In the arrangement of gearing shown in Fig. 1 the bevel gear-wheels *i i'* will make sixty revolutions to one of the wheel *l*. Hence one revolution of the wheel *a* will cause the spindle *e* (and consequently the index-hand *f*) to turn sixty times, and the reading of the degree will be at each revolution of the index-hand *f* in minutes and minute fractions thereof.

The operation is as follows: In taking a bearing the plate *b* is turned in order to sight through the telescope some object in line with the bearing. In case it is a certain number of degrees and a fraction over, the fraction is determined in this way: The spindle *e* is turned by means of the thumb-screw *h*, thereby through the intermediate gearing rotating the upper plate *b* until the object in line with the bearing is at the center of the cross-wires in the telescope. The pointer *f*, being thereby rotated a certain number of times within sixty, will determine how many minutes and parts of minutes are contained in the fraction of the degree. From this it will be apparent that the minutes can be measured in seconds and subdivisions of seconds, so that the minutest part of a degree can be instantly determined on the dial-plate and be recorded therefrom by the surveyor in his note-book.

It is evident that the same method of determining the value of the angle can be used in case the transit-instrument is constructed with additional devices for determining vertical angles. It is then only necessary to apply my invention to the vertical circle in order to read the degrees made on such vertical circle. Verniers have been used on these vertical circles to read to minutes, and some to half-minutes, (only the most expensive transit-instruments read to half-minutes;) but with my invention even seconds can be read, and that without danger of making errors in the reading, as is sometimes the case with the use of the vernier-plate.

In the modification, Fig. 4, the same transit-instrument is shown as in Fig. 1. The only difference is in the gearing intermediate between the spindle of the dial-plate and the cog-rack on the periphery of the upper plate *b*. It is evident that this gearing can be changed to suit the construction of the particular transit-instrument to which my invention may be applied. I do not, therefore, limit myself to the use of any particular form of gearing in the practice of the invention.

In the modification, Fig. 4, I substitute for one of the worm-gears a cog-gearing. The arrangement as shown in Fig. 4 is as follows: The spindle *e* has a cog-wheel *u*, and the shaft *m* has a bevel gear-wheel *v*. This wheel *v* meshes with the bevel gear-wheel *v'* contained on the shaft *m*. The latter wheel *v'* also contains a series of cogs *w* on its periphery. Intermediate between the cog-wheels *u* and *w* is a cog-wheel *x*, which may be of any convenient size suitable to the transit-instrument on which the gearing is placed. The cog-wheel *u* is to the cog-wheel *w* as one is to four, and one revolution of the bevel-wheel *v* represents one degree on the compass-circle. This will cause the index-hand *f* on the spindle *e* to make four revolutions to a degree. Each of these revolutions will consequently represent fifteen minutes, and said fifteen minutes are divided into seconds and parts of seconds. I prefer, however, the system of gearing shown in Figs. 1, 2, and 3, as each revolution of the index-hand *f* on the dial-plate *d* represents one-sixtieth of a degree, or, in other words, one minute, thus giving a very close computation of the value of the angle sought.

In the construction of the special form of instrument shown in the drawings I make the upper plate free to turn entirely around on the compass-plate. By so doing I can in field work always have indicated on the instrument the value of all the angles measured, and on arriving at the point of beginning verify the work. For this purpose I attach an index-finger plate *y*, or an equivalent marking-point, to the upper plate *b*, as seen at Figs. 1 and 2. The north point of the compass-plate will coincide with this index-finger at the completion of the work, if all the angles have been properly determined. In other transit-instruments, by reason of their construction, the verification of the work at the finish has to be determined by a computation of the value of the angles without the aid of the instrument.

I claim—

1. In a transit-instrument, the combination, with the compass circular plate containing a dial having minute subdivisions of a degree arranged within said compass circular plate, of a telescope-plate, the two plates being connected together, so as to be operated in conjunction, by gearing, substantially as described.

2. In a transit-instrument, the combination of the compass circular plate *a*, containing a dial *d* and its index-hand *f*, with a telescope-plate *b*, containing a circular cog-rack upon its outer edge, and intermediate gearing composed of bevel gear-wheels *i i'*, shaft *j*, worm-wheel *k*, cog-wheel *l*, shaft *m*, and worm-wheel *n*, substantially as described.

3. In a transit-instrument, the combination of a dial *d*, its index-hand *f*, bevel gear-wheels $i\ i'$, shaft $j$, worm-wheel $k$, cog-wheel $l$, shaft $m$, and worm-wheel $n$ with the circular cog-rack $g$, placed on the upper plate $b$, substantially as described.

4. In a transit-instrument, the arrangement of a circular cog-rack upon the outer edge or periphery of the telescope-plate $b$, in combination with the compass circular plate $a$, containing a dial $d$, the two plates $a$ and $b$ being connected by gearing, and a plate or slide $r$, traveling in ways $s\ s$ on the compass circular plate $a$, so as to permit of disconnecting the gearing on the instrument, substantially as described.

5. In a transit-instrument, the combination, with the compass circular plate, of a plate carrying the telescope and containing an index-finger or marking-point for coinciding with the north pole of the compass, the two plates being free to turn entirely around on each other, substantially as described.

CLINTON SUTPHEN.

Witnesses:
    ANDREW M. TODD,
    JAMES C. WARD.